United States Patent
Badescu et al.

(10) Patent No.: US 10,880,402 B1
(45) Date of Patent: Dec. 29, 2020

(54) SYSTEM AND METHOD FOR DYNAMIC ROUTING OF MESSAGES BETWEEN NETWORKS

(71) Applicant: Intuit Inc., Mountain View, CA (US)

(72) Inventors: Gabriel Badescu, San Diego, CA (US); Kiyanosh Kamdar, Carlsbad, CA (US); Chengappa D. Iychodianda, San Diego, CA (US); Pankaj Sikka, San Diego, CA (US); Samer Abdulaziz, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/523,689

(22) Filed: Jul. 26, 2019

(51) Int. Cl.
*H04L 29/08* (2006.01)
*H04L 12/725* (2013.01)
*H04L 12/741* (2013.01)
*H04L 12/721* (2013.01)
*H04L 12/771* (2013.01)
*H04L 12/715* (2013.01)

(52) U.S. Cl.
CPC ............ *H04L 67/327* (2013.01); *H04L 45/04* (2013.01); *H04L 45/306* (2013.01); *H04L 45/38* (2013.01); *H04L 45/56* (2013.01); *H04L 45/74* (2013.01)

(58) Field of Classification Search
CPC ....... H04L 45/04; H04L 45/306; H04L 45/38; H04L 45/56; H04L 45/74; H04L 67/327; G06F 3/0629; G06F 3/06; G06F 3/067; G06F 3/0646
See application file for complete search history.

(56) References Cited

U.S. PATENT DOCUMENTS

| 10,282,130 B2* | 5/2019 | Chen ................ G06F 3/0619 |
| 10,540,277 B2* | 1/2020 | Soulie ............... G06F 30/394 |
| 2005/0246547 A1* | 11/2005 | Oswald .............. H04L 63/08 713/182 |
| 2014/0222917 A1* | 8/2014 | Poirier .............. H04L 67/06 709/204 |
| 2017/0035232 A1* | 2/2017 | Sandlin ............ A47G 29/124 |
| 2019/0238619 A1* | 8/2019 | Mantrana-Exposito ............ G06F 16/00 |

OTHER PUBLICATIONS

Dropbox.com, "Move files between two Dropbox accounts", address: "https://help.dropbox.com/accounts-billing/multiple-accounts/move-files-between-accounts"—archive.org capture: Jul. 2, 2019 (Year: 2019).*

* cited by examiner

*Primary Examiner* — Jerry B Dennison
(74) *Attorney, Agent, or Firm* — Paradice and Li LLP (57) ABSTRACT

A method and system automatically and dynamically creates routes between message dropboxes in separate data center infrastructures. The method and system determines that a first message dropbox in a first data center infrastructure is routable to a second message dropbox in a second data center infrastructure based on the names or policies of the first and second message dropboxes. After routability is determined, the method and system automatically creates and implements a route between the first and second message dropboxes in real time.

20 Claims, 6 Drawing Sheets

SYSTEM AND METHOD FOR DYNAMIC ROUTING OF MESSAGES BETWEEN NETWORKS

BACKGROUND

Large software systems, such as data management systems, often include many subsystems. These subsystems typically need to share data and communicate with each other to provide a user of the data management system the full capabilities of the data management system. For example, a data management system, such as a tax preparation system, may have a subsystem that records when users login to the data management system. In addition, one or more other subsystems may need to obtain data representing this and other user login activity in order to provide more personalized data management services to users.

In order to enable data exchange and communication between subsystems of the data management system, many data management systems provide a messaging platform. The messaging platform enables communication between different subsystems or software applications associated with the data management system. Often these messaging platforms provide asynchronous communication between subsystems such that one subsystem or application can drop a message at a message drobox destination and other subsystems can retrieve the message at another time. This type of messaging platform can be effective as long as all related subsystems or applications operate in a same data center infrastructure.

However, given recent advances in technology, it is often the case that the various subsystems or applications associated with a data management system are implemented in different data centers or other computing infrastructures. For example, a data management system may operate in a traditional data center infrastructure along with some of its associated subsystems or applications. However, for various reasons, the data management system may also utilize a third-party cloud computing platform as a second data center infrastructure for other subsystems and software applications. In this case, some subsystems and software applications may be implemented in the traditional data center infrastructure while some operate in the third-party cloud computing infrastructure. Additionally, the data management system may move some of the subsystems or applications from one data center infrastructure to another.

When the messaging platform needs to enable messaging between related subsystems and software applications implemented in different data center infrastructures, the data management systems have traditionally used a routing service. Traditionally, these routing services define static routes between destinations in different data centers. The statically defined routes are then used to carry messages between destinations in the separate data center infrastructures.

This traditional method of defining static routes has several drawbacks. First, any time a new route needs to be added between destinations in different data center infrastructures, the route must be defined in a data file. Before the route can be implemented, the routing service must be restarted. Restarting the routing service causes an interruption in the messaging platform as messages cannot be carried between data center infrastructures while the routing service is restarted.

Additionally, defining a new route in the routing service typically requires a software engineer to manually revise the software code in the routing service. This can be a very time-consuming process. Furthermore, this process can be prone to error because there may be unforeseen, or newly introduced, problems in the revised software code.

Accordingly, the process of defining and implementing static routes in a routing service is costly in terms of performance, human resources, and computing resources. This, in turn, results in interruptions to computing systems and human activity which can be very problematic for the data management systems and the end users' experience.

What is needed is a method and system that overcomes the long-standing technical problem of static route definition and implementation for carrying messages between separate data center infrastructures.

SUMMARY

Embodiments of the present disclosure allow a messaging platform of a data management system to automatically and dynamically establish and implement messaging routes between destinations in different data centers without interrupting the messaging platform.

According to the disclosed embodiments, the messaging platform provides a user interface that can be accessed by subsystems and applications of the data management system. According to the disclosed embodiments, the interface allows the subsystems to edit properties of a message dropbox. These editable properties can include the name and policy data associated with the message dropbox. The name or policy data can include a keyword or keywords indicating that the message dropbox is routable.

According to the disclosed embodiments, the messaging platform reads the message dropbox properties, including the indication of routability and automatically creates a route in the routing service. The messaging platform can create a route to a message dropbox indicated in the properties. Alternatively, the messaging platform can create a route to other message dropboxes that share the policy data indicated in the properties.

Using the disclosed embodiments, the routing service does not need to be restarted before the route can be implemented. Additionally, using the disclosed embodiments, software engineers do not need to manually access the software code of the routing service. Instead, the messaging platform automatically and dynamically defines and implements the routes during operation of the messaging platform.

Using the disclosed embodiments, data source routes can be added and revised without substantive adjustments to the source code of the application. Consequently, using the disclosed embodiments, the risk of damaging the functionality of the application associated with traditional methods is avoided. In addition, using the disclosed embodiments, a routing file can be created or revised within the routing library, and the callout to the routing file can be added to the application source code. Consequently, the problem of restarting the routing service and the associated interruptions to messaging associated with traditional methods is also eliminated using the disclosed embodiments.

As a result of these and other advantages discussed in more detail below, the disclosed embodiments represent an efficient, effective, and high flexible technical solution to the long-standing technical problem of static route definition and implementation for carrying messages between separate data center infrastructures.

Common reference numerals are used throughout the FIGs and the detailed description to indicate like elements. One skilled in the art will readily recognize that the above FIGs are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments.

Embodiments may be implemented in many different forms and should not be construed as limited to the embodiments set forth herein, shown in the FIGs, and described below. Rather, these exemplary embodiments are provided to allow a complete disclosure that conveys the principles of the invention, as set forth in the claims, to those of skill in the art.

Embodiments of the present disclosure enable the automatic and dynamic creation of messaging routes between message dropboxes in separate data center infrastructures. Some subsystems of a data management system may be implemented in a first data center infrastructure. Other subsystems of the data management system may be implemented in a second data center infrastructure. A messaging platform enables subsystems from the first data center infrastructure to send and receive messages to subsystems in the second data center infrastructure.

The messaging platform provides an interface that enables the subsystems to name their message dropboxes and to define their properties. The messaging platform uses the names and properties of the message dropboxes to determine whether messaging routes need to be established between message dropboxes of the first and second data center infrastructures. When a subsystem names a message dropbox, the messaging platform dynamically restructures a routing service to define routes between the message dropboxes based on the names and properties of the message dropboxes.

Figure 1:
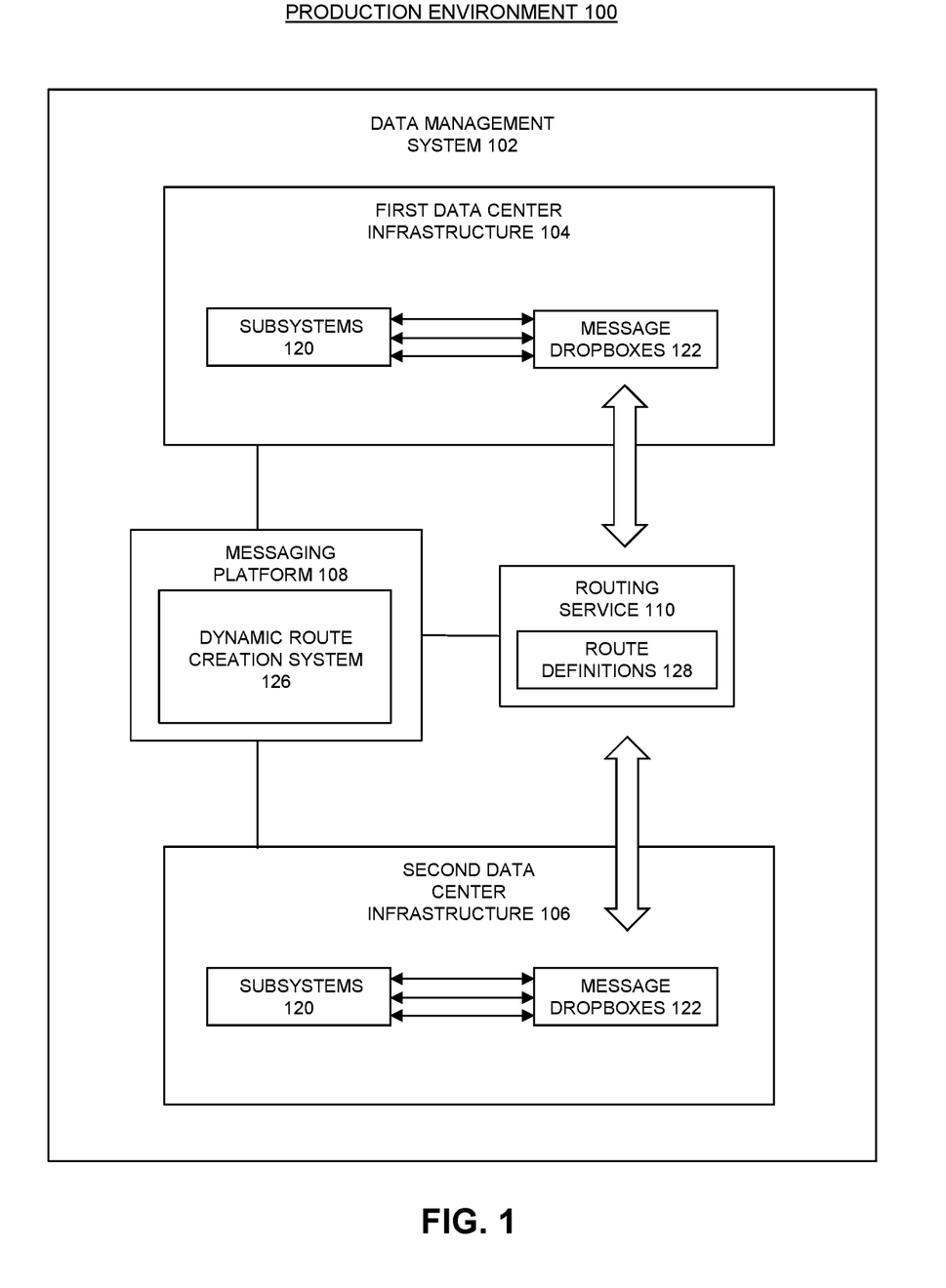
FIG. 1 is a block diagram of a data management system, in accordance with one embodiment.

FIG. 1 illustrates a block diagram of a production environment 100 for dynamically and automatically establishing messaging routes between separate data center infrastructures, according to one embodiment. The production environment 100 includes a data management system 102.

The data management system 102 can include one or more of a tax return preparation system, a bookkeeping system, a personal budgeting system, a financial transaction tracking system, or any other application as discussed herein, known in the art, or as later developed. The data management system 102 can be a standalone system that provides data management services to users. Alternatively, the data management system 102 can be integrated into other software or service products provided by a service provider. Users access the data management system in order to utilize the data management system and to receive data management services.

The data management system 102 utilizes a first data center infrastructure 104 and a second data center infrastructure 106. The data management system 102 also utilizes a messaging platform 108 and a routing service 110. The first data center infrastructure 104, the second data center infrastructure 106, the messaging platform 108, and the routing service 110 are communicatively coupled to each other with one or more communication channels, according to one embodiment.

The data management system 102 can include multiple subsystems 120 or applications. Each subsystem or application is a software system or application that performs a function within the data management system 102. For example, a data management system may have a subsystem that records when users login to the data management system. One subsystem may select and personalize user interface systems for users based on their activities and characteristics. One subsystem may generate documents, such as invoices, for users. One subsystem may retrieve financial transaction data for users. The data management system 102 can include a large number of subsystems 120. As will be discussed in more detail below, these subsystems 120 may send and receive messages to each other in order to synchronize and integrate with each other as they perform their various functions in the data management system 102.

The data management system 102 may utilize a first data center infrastructure 104 and a second data center infrastructure 106. In one example, the first data center infrastructure 104 is a physical data center implemented by the data management system 102. The physical data center can include physical computer processing resources, physical computer memory resources, and physical data transmission and communication resources. Some of the subsystems 120 of the data management system 102 are implemented in the first data center infrastructure 104.

In one example, the second data center infrastructure 106 can include a cloud computing infrastructure. The cloud computing infrastructure can be a third-party cloud computing infrastructure. The data management system 102 can access virtual computer processing resources, virtual computer memory resources, and virtual data transmission and communication resources. The cloud computing infrastructure can be provided by a cloud computing platform provider. Examples of cloud computing platform providers can include, but are not limited to, Amazon AWS, Google Cloud Platform, or Microsoft Azure. The data management system 102 can utilize the cloud computing infrastructure to implement one or more of the subsystems 120 of the data management system 102.

In another example, both the first data center infrastructure 104 and the second data center infrastructure 106 are implemented in cloud computing environments. The first and second data center infrastructures 104, 106 can be implemented in different cloud computing infrastructures. In another example, the first data center infrastructure 104 and the second data center infrastructure 106 are both implanted in physical data centers operated by the data management system 102.

Accordingly, as used herein, separate data center infrastructures can include data center infrastructures that are physically separate from each other, such as data centers located in different cites or locations. Separate data center infrastructures can include data center infrastructures that are hosted by different computing platforms, such as different cloud computing platform providers. Separate data center infrastructures can include data infrastructures for which a first data center infrastructure corresponds to a first physical data center and a second data center infrastructure corresponds to a cloud computing data center infrastructure.

The messaging platform 108 enables subsystems 120 of the data management system 102 to send messages to each other. The messaging platform 108 utilizes message dropboxes 122. A subsystem 120 that generates a message will leave the message in one of the message dropboxes 122. A subsystem that is a recipient of the message then accesses the message dropbox 122 and retrieves the message.

When all of the subsystems involved in the sending and receiving of a message are implemented in the same data center infrastructure, then the use of the message dropboxes 122 is less complicated. A first subsystem generates a message and leaves the message in one of the message dropboxes 122. Any subsystem 120 that is involved in the messaging policy can then access that message dropbox in the first data center infrastructure 104 in order to retrieve the message.

The messaging platform is a system that enables the various services or subsystems of a data management system to communicate with each other. The services or subsystems may share data with each other. The messaging platform enables the services or subsystems to share the data with each other. The messages can include any data that one service or subsystem provides to another. For example, a message may include login data provided by a login tracking service to any other service that can use login tracking data to perform or improve their functions. A message dropbox can be an addressable location hosted by the messaging platform that can receive messages and enable subscribed subsystems to retrieve those messages.

When subsystems 120 in separate data center infrastructures send and receive messages, the process can be somewhat more complicated. In these cases, the messaging platform 108 utilizes the routing service 110. The routing service 110 carries messages between a message dropbox 122 of one of the data center infrastructures and drops the message at a message dropbox 122 in the other data center infrastructure.

For example, if a subsystem 120 in the first data center infrastructure 104 generates a message for a subsystem 120 in the second data center infrastructure 106, then the subsystem in the first data center infrastructure 104 will drop the message in a message dropbox 122 of the first data center infrastructure 104. The routing service 110 will then carry the message to a message dropbox 122 in the second data center infrastructure 106. The recipient subsystem 120 can then access the message from the appointed message dropbox 122 in the second data center infrastructure 106.

The routing service 110 includes a plurality of route definitions 128. The route definitions 128 define routes established between message dropboxes 122 in the first and second data center infrastructures 104, 106. The routing service 110 carries the messages between message dropboxes 122 in separate data center infrastructures based on the route definitions 128. In order for the routing service 110 to carry the message between two message dropboxes in separate data center infrastructures, the routing service 110 must utilize a route defined in the route definitions 128.

The messaging platform 108 utilizes the dynamic route creation system 126 to enable the dynamic creation and implementation of routes for the routing service 110. The dynamic route creation system 126 can create routes that can be implemented by the routing service 110 quickly without the need to restart or otherwise interrupt any aspects of the messaging platform 108 or the routing service 110.

Accordingly, as opposed to systems based on static routes, the disclosed dynamic route creation system 126 enables the creation of routes on the fly. The dynamic route creation system 126 listens for the creation of new messaging routes between subsystems in separate data center infrastructures. If the dynamic route creation system 126 detects an attempt to send a message on a previously unestablished route between the first and second data center infrastructures 104, 106, then the dynamic route creation system 126 accesses the route definitions 128 of the routing service 110. The dynamic route creation system 126 then writes a new route definition defining the previously unestablished route. The dynamic route creation system 126 causes the routing service 110 to implement the newly defined route. The routing service 110 then carries a message between the message dropboxes 122 in accordance with the newly defined route.

The dynamic route creation system 126 creates the new route definition automatically. Software engineers do not need to access the routing service 110 to establish a new route definition. The dynamic route creation system 126 accesses the route definitions 128 and creates the new route definition without any human intervention. The dynamic route creation system 126 accesses the route definitions 128 responsive to detecting an attempt by a subsystem 120 to send the message for the first time on a route that had not yet been established.

To this end, the dynamic route creation system 126 provides a user interface to the subsystems 120. When a subsystem 120 wishes to establish the messaging routes to a second subsystem 120, the subsystem 120 accesses the user interface. The user interface enables the subsystem 120 to select the properties, including the name and policies, of a message dropbox 122. As will be set forth in more detail below, the name and policies of the message dropbox 122 provide an indication of whether there are message dropboxes in other data center infrastructures that will receive messages dropped in the message dropbox 122.

The user interface can be utilized by experts or engineers that manage subsystems. In this case, the experts or engineers can provide the names and policies of message dropboxes. The dynamic route creation system 126 can then generate routes based on the names and policies. Alternatively, the user interface can be utilized automatically by the subsystems 120 to provide name and policy data for message dropboxes. In this case, the user interface can include an application programming interface (API).

As discussed in more detail below, when a message is dropped in a message dropbox 122 whose name or policies have been newly adjusted, the dynamic route creation system 126 accesses the name and policy of the message dropbox 122. If the name or policies of the message dropbox indicate that a separate data center infrastructure should receive messages dropped in the newly edited message dropbox, then the dynamic route creation system 126 accesses the route definitions 128 and defines a new route in accordance with the name or policies of the newly edited message dropbox 122. The routing service 110 immediately implements the new route and carries any messages between the first and second infrastructure 104, 106 in accordance with the newly defined routes.

In one embodiment, the messaging platform 108 can be implemented in a Java message service (JMS) environment. In one embodiment, the messaging platform 108 can utilize an ActiveMQ system in the JMS environment. In one embodiment, the routing service 110 is a Camel routing service of the ActiveMQ system. The dynamic route creation system 126 can access the Camel source code to dynamically generate new routes in the route definitions 128.

In one example, each message dropbox 122 can correspond to one of two types. The first type of message dropbox is a queue type message dropbox. In a queue type message dropbox there is only one recipient of each message. A first subsystem 120 drops the message in the queue type message dropbox. A second subsystem 120 retrieves the message from the queue type message dropbox. The second subsystem 120 is the only subsystem 120 that receives the message. Thus, queue type message dropboxes facilitate private messages between only two subsystems 120. The second type of message dropbox is a topic type message dropbox. The topic type message dropbox enables a first subsystem 120 to send a message to multiple second subsystems 120. The queue type message dropboxes and the topic type message dropboxes will be described with greater detail in relation to FIG. 2 and FIG. 3.

Figure 2:
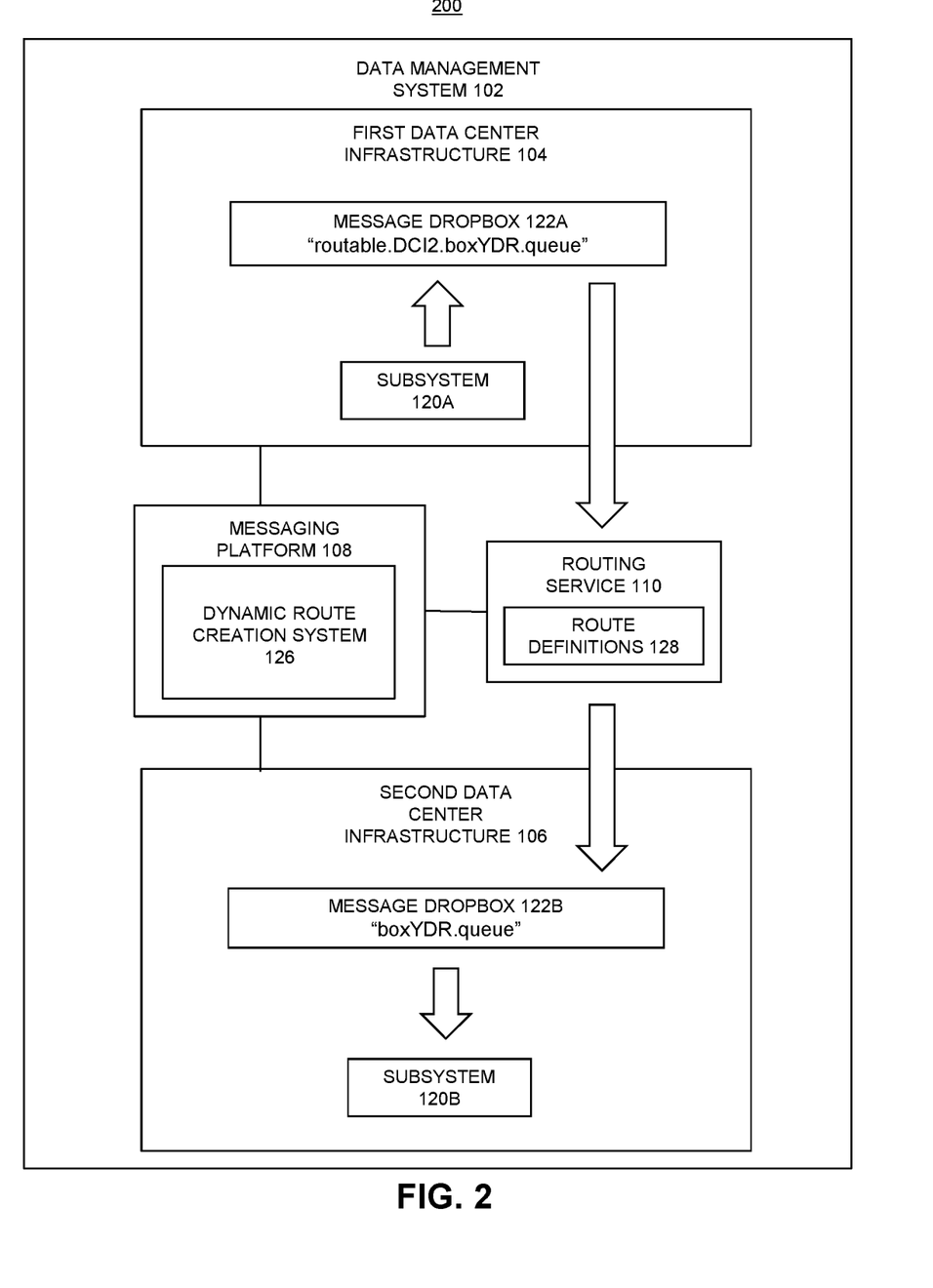
FIG. 2 is a block diagram of the data management system of FIG. 1 in a first scenario, in accordance with one embodiment.

FIG. 2 is a block diagram of the data management system 102 of FIG. 1 in a scenario 200 in which a new queue type message dropbox has been created. Prior to sending a message, the subsystem 120A has accessed the user interface of the dynamic route creation system 126 to create the name of a message dropbox 122A. The new message dropbox 122A is a queue type message dropbox. Subsystem 120A can upload messages to the queue type message dropbox 122A. The dynamic route creation system 126 will ensure that the routing service 110 carries the messages to the message dropbox 122B in the second data center infrastructure 106.

The dynamic route creation system 126 enables the subsystem 120 to specify the name of the message dropbox 122A via the user interface. The name of the message dropbox will determine whether messages placed in the message dropbox 122A will be routed to a message dropbox in a separate data center infrastructure. The name of the message dropbox should indicate whether the message dropbox is routable. The name of the message dropbox 122A should also indicate the name of the message dropbox to which messages will be routed from the message dropbox 122A. The name of the message dropbox 122A can also indicate the data center infrastructure of the destination message dropbox.

In the example of FIG. 2, the subsystem 120A has named the message dropbox 122A "routable.DCI2.boxYDR.queue". The string "routable" in the message dropbox name indicates that the message dropbox 122A is routable. The string "DCI2" indicates that the destination message dropbox is in the second data center infrastructure 106. The string "boxYDR" is the name of the destination message dropbox in the second data center infrastructure 106. The string "queue" indicates that the message dropbox 122A is a queue type message dropbox. Accordingly, the name of the message dropbox can have a plurality of expected fields delineated by periods. A first field may indicate whether the dropbox is routable to a second dropbox. A second field may indicate the data center infrastructure of the second dropbox. A third field may indicate the name or address of the second message dropbox. The route creation system can include or have access to a database of message dropbox names within the various data center infrastructures. A fourth field may indicate a type of the first dropbox.

The name of the message dropbox 122A indicates that the message dropbox 122A is routable to a message dropbox named boxYDR.queue in the second data center infrastructure 106. The first time that the subsystem 120A uploads a message to the message dropbox 122A, the dynamic route creation system 126 detects that a new message dropbox is being used for the first time. The dynamic route creation system 126 reads the name of the message dropbox 122A. The dynamic route creation system 126 determines that a new route needs to be created for the routing service 110 to carry messages from the message dropbox 122A in the first data center infrastructure 104 to the second message dropbox 122B in the second data center infrastructure 106. The dynamic route creation system 126 automatically accesses the routing service 110 and generates a route definition among the route definitions 128 for the new route. The routing service 110 then carries the message from the message dropbox 122A to the message dropbox 122B. In the example of FIG. 2, "boxYDR" indicates the second dropbox 122B.

In one example, the term "routable" means that messages dropped in a message dropbox are meant to be routed to one or more second message dropboxes in one or more second data center infrastructures. A subsystem only retrieves messages from a dropbox in its own data center infrastructure. Accordingly, routable means that there is a second dropbox in a separate data center infrastructure to which messages placed in the first dropbox should be routed.

Those of skill in the art will recognize, in light of the present disclosure, that other naming conventions can be used to indicate to a dynamic route creation system 126 that a message dropbox is routable, as well as the destination to which messages should be routed. All such other conventions fall within the scope of the present disclosure.

Figure 3:
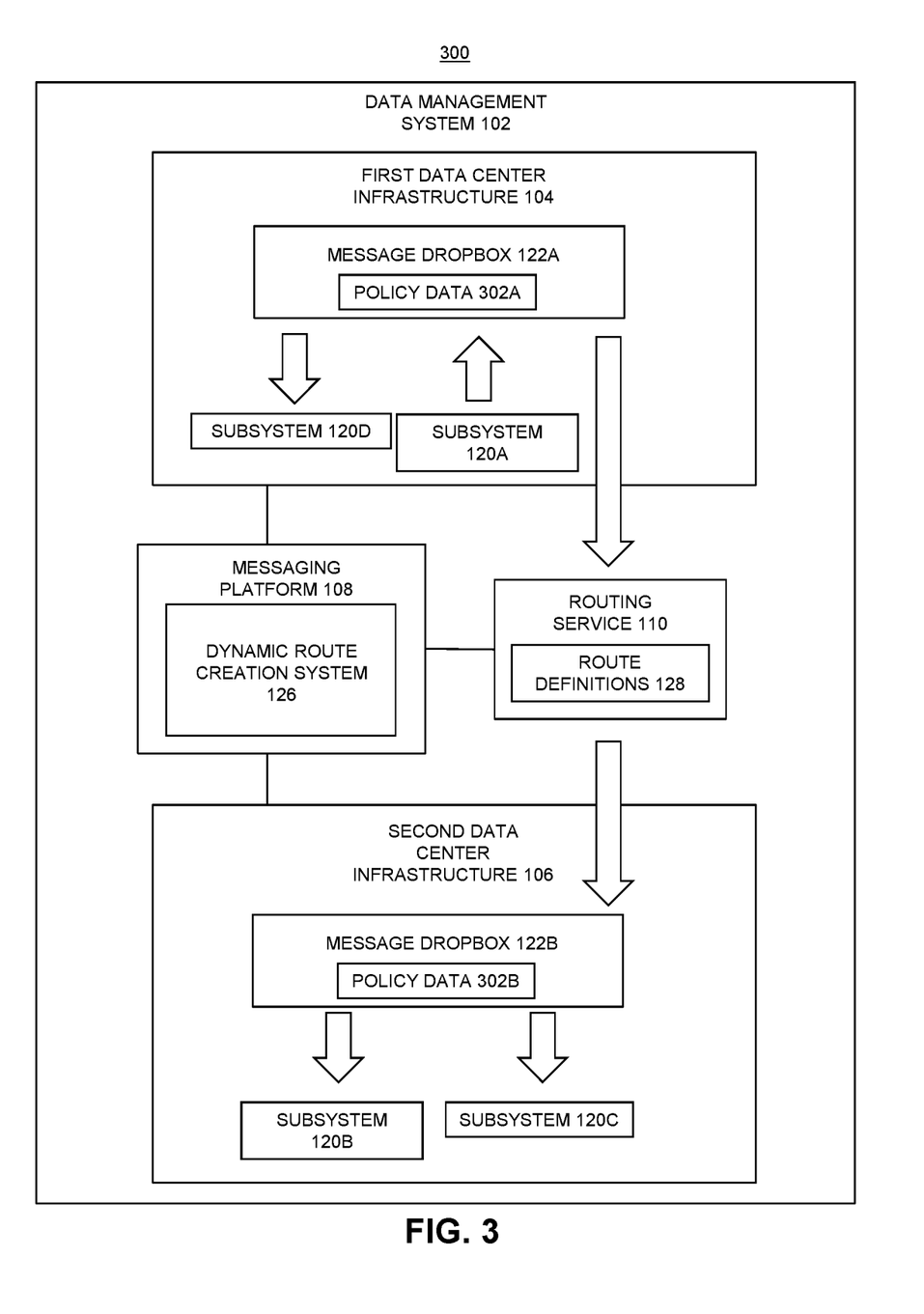
FIG. 3 is a block diagram of the data management system of FIG. 1, in accordance with one embodiment.

FIG. 3 is a block diagram of the data management system 102 in a scenario 300 in which a new topic type message dropbox has been created in the data management system 102 of FIG. 1, according to one embodiment. A topic type message dropbox is one in which multiple subsystems can retrieve a copy of a message. Thus, if a subsystem uploads a message to a topic type message dropbox, all of the subsystems that are subscribed to that message dropbox can retrieve a copy from the message dropbox. The scenario 300 is an example in which one or more of the subscribed subsystems are in a different, second, data center infrastructure 106.

In FIG. 3, a subsystem 120A creates a topic type message dropbox 122A in the first data center infrastructure 104. Subsystems 120B, 120C, and 120D are subscribed to the message dropbox 122A. However, subsystems 120B and 120C are in the second data center infrastructure 106. In particular, subsystems 120B and 120C are to receive their messages from the message dropbox 122B in the second data center infrastructure 106. Accordingly, the dynamic route creation system 126 ensures that the routing service 110 routes messages from the message dropbox 122A to the message dropbox 122B

The message dropbox 122A includes policy data 302A. The message dropbox 122B includes policy data 302B. When subsystem 120A sets up a message dropbox 122A, the subsystem 120A accesses a user interface provided by the dynamic route creation system 126 in order to define the policy data 302A. The policy data 302A defines the policies for the message dropbox 122A. The policy data 122A can indicate that the message dropbox 122A is a topic type message dropbox, that the message dropbox 122A is a routable message dropbox and can include a list of data center infrastructures to which messages are routable.

The dynamic route creation system 126 utilizes the policy data 302 to establish new route definitions 128. The first time that a message is uploaded to the message dropbox 122A after it has been created, or after its name or policies have been edited, the dynamic route creation system 126 immediately reads the policy data 302A. The dynamic route creation system 126 reads the policy data 302A to determine if the message dropbox 122A is routable, whether it is a topic type message dropbox, and the data center infrastructures to which the messages are routable.

If the policy data 302A indicates that the message dropbox 122A is a topic type message dropbox and is routable, then the dynamic route creation system 126 reads the policy data of all other message dropboxes in all of the data center infrastructures. The dynamic route creation system 126 identifies all message dropboxes that have policy data that matches or complies with the policy data 302A. If the policy data of any message dropbox matches or complies with the policy data 302A, the dynamic route creation system 126 establishes new routes for the routing service 110. In particular, the dynamic route creation system 126 accesses the route definitions 128 and defines new routes from the message dropbox 122A to all message dropboxes that have matching or compatible policy data.

In the example of FIG. 3, the message dropbox 122B in the second data center infrastructure 106 has policy data 302B that matches the policy data 302A. The dynamic route creation system 126 automatically defines a new route in the route definitions 128 between the message dropbox 122A and the message dropbox 122B. The routing service 110 then carries any message dropped in the message dropbox 122A to the message dropbox 122B.

In the example of FIG. 3, subsystem 120B and subsystem 120C are subscribed to the message dropbox 122B. When a message is carried from the message dropbox 122A to the message dropbox 122B, both the subsystem 122B and the subsystem 120C receive a copy of the message from the message dropbox 122B because the message dropbox 122B is a topic type message dropbox from which multiple subscriber subsystems can receive a copy of a message.

In the example of FIG. 3, the subsystem 120D in the first data center infrastructure 104 is subscribed to the message dropbox 122A. The subsystem 120D receives a copy of any message dropped in the message dropbox 122A, just like the subsystems 120B and 120C. In practice, there can be a large number of subsystems subscribed to a topic type message dropbox.

Figure 4:
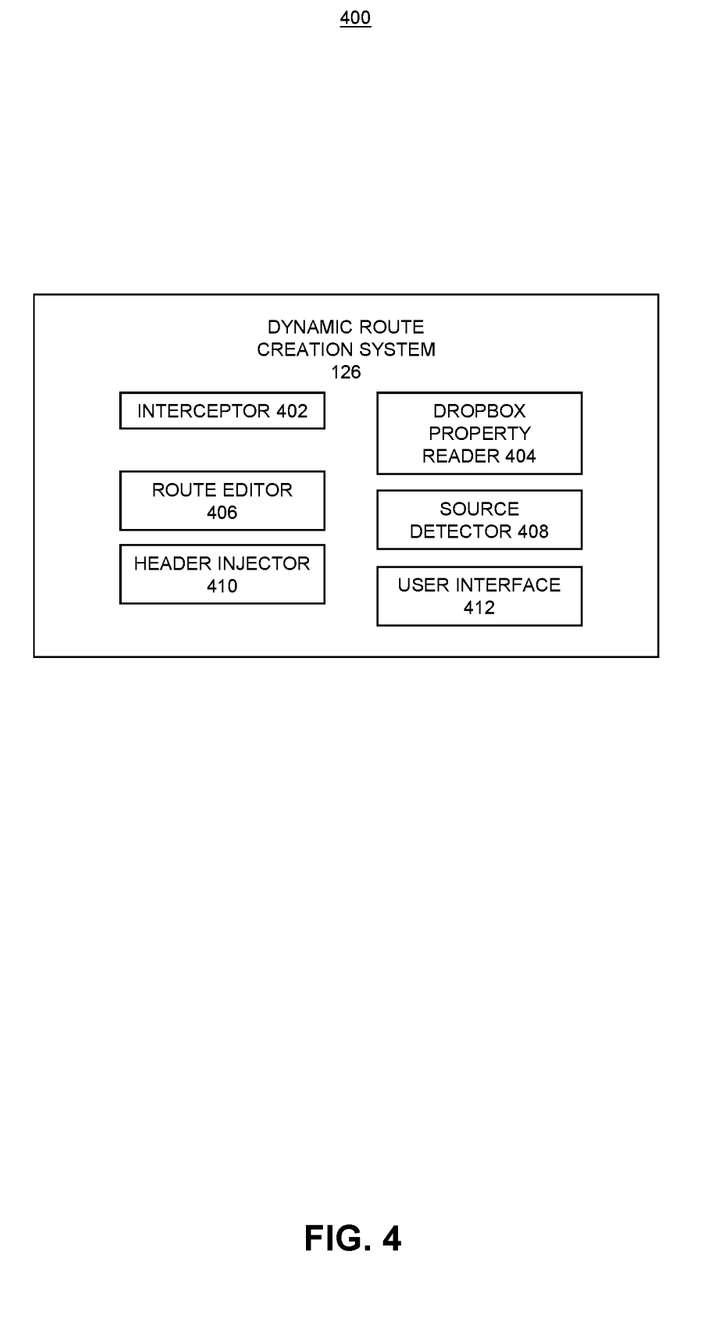
FIG. 4 is a block diagram of a dynamic route creation system, in accordance with one embodiment.

FIG. 4 is a block diagram of a dynamic route creation system 126 of the messaging platform 108, according to one embodiment. The dynamic route creation system 126 includes an interceptor 402, a message dropbox property reader 404, a route editor 406, a source detector 408, a header injector 410, and a user interface 412. The dynamic route creation system 126 utilizes the interceptor 402, the message dropbox property reader 404, the route editor 406, the source detector 408, the header injector 410, and the user interface 412 to dynamically establish new routes for a messaging platform 108.

The interceptor 402 enables the dynamic route creation system 126 to identify when a message has been dropped in a message dropbox for the first time. In particular, the interceptor 402 identifies if a message has been dropped into a message dropbox for the first time after the message dropbox has been created or its name or policies modified. The interceptor 402 detects these events so that the dynamic route creation system 126 can proceed to create a new route in the routing service 110 in real time.

When the interceptor 402 detects a first message event, the dynamic route creation system 126 uses the message dropbox property reader 404 to read the properties of the message dropbox into which the message has been dropped. The message dropbox property reader 404 reads the name of the message dropbox. If the name of the message dropbox indicates that the message dropbox is a queue type message dropbox, that the message dropbox is routable, and the name of the recipient message dropbox, then the dynamic route creation system 126 can proceed to create a new route for the queue type message dropbox.

The message dropbox property reader 404 also reads the policy data associated with the message dropbox. If the policy data indicates that the message dropbox is a topic type message dropbox and that the message dropbox is routable, then the message dropbox property reader 404 proceeds to read the policy data for all other message dropboxes in order to identify any message dropboxes that have the same policy data, or compatible policy data with the subject message dropbox. The dynamic route creation system 126 can then create new routes to any message dropboxes that have matching or compatible policy data.

The policy data of a first topic type dropbox can include a name or partial name of the first dropbox. The policy data can include the names or partial names of other message dropboxes that should receive messages dropped in the first message dropbox. Determining whether policy data matches or is compatible can include determining whether the policy data of the one or more second dropboxes includes an indication that the one or more second dropboxes are linked to the first message dropbox. Accordingly, policy data may include a name of the first message dropbox, or a name of a policy of the first message dropbox. Compliant or matching policy data can correspond to the inclusion of a policy identification string. All message dropboxes whose policy includes the policy identification string included in the policy of the first dropbox will receives messages deposited in the first message dropbox.

The dynamic route creation system 126 utilizes the route editor 406 to access the route definitions 128 in the routing service 110. In particular, if the message dropbox property reader 404 determines that one or more new routes are to be created based on the property of a new or updated message dropbox, then the route editor 406 creates the new routes. The route editor 406 creates the new routes by accessing the route definitions 128 of the routing service 110 and inserting new route definitions in accordance with properties of the new or updated message dropbox. The route editor 406 is able to add the new definitions in real time without interrupting the function of the messaging platform 108.

The source detector 408 detects the source of any new message dropped in a message dropbox. If two message dropboxes in different data center infrastructures have a route between them, then it is possible that a message could continually be passed back and forth in an endless loop. The source detector 408 determines the original source of any new message.

After the source detector 408 has determined the original source of a new message, the header injector 410 injects a header indicating the source of the new message. This ensures that the routing service will not route a message from a first message dropbox to a second message dropbox, and then from the second message dropbox back to the first message dropbox. This is because the header injector 410 injects a header indicating that the message was first dropped in the first message dropbox. If this header is absent, it is possible that the messaging platform would determine that a message dropped in the second dropbox should be routed back to the first dropbox. The message would then be cycled back and forth in an infinite loop. The header prevents this from happening.

The user interface 412 enables subsystems 120 to edit the name and policy data related to a message dropbox 122. The subsystem itself can automatically access the user interface 412 to edit the name and policy data. Alternatively, a software engineer or another expert associated with the subsystem 120 can access the user interface 412 in order to edit the name or policy data of a message dropbox 122. In this case, the user interface can include a graphical user interface with graphical objects and data fields with which an individual can interact.

Referring to FIGS. 1-5, and the description of FIGS. 1-4 above, in one embodiment, process 500 begins at 502 and process flow proceeds to 504.

Figure 5:
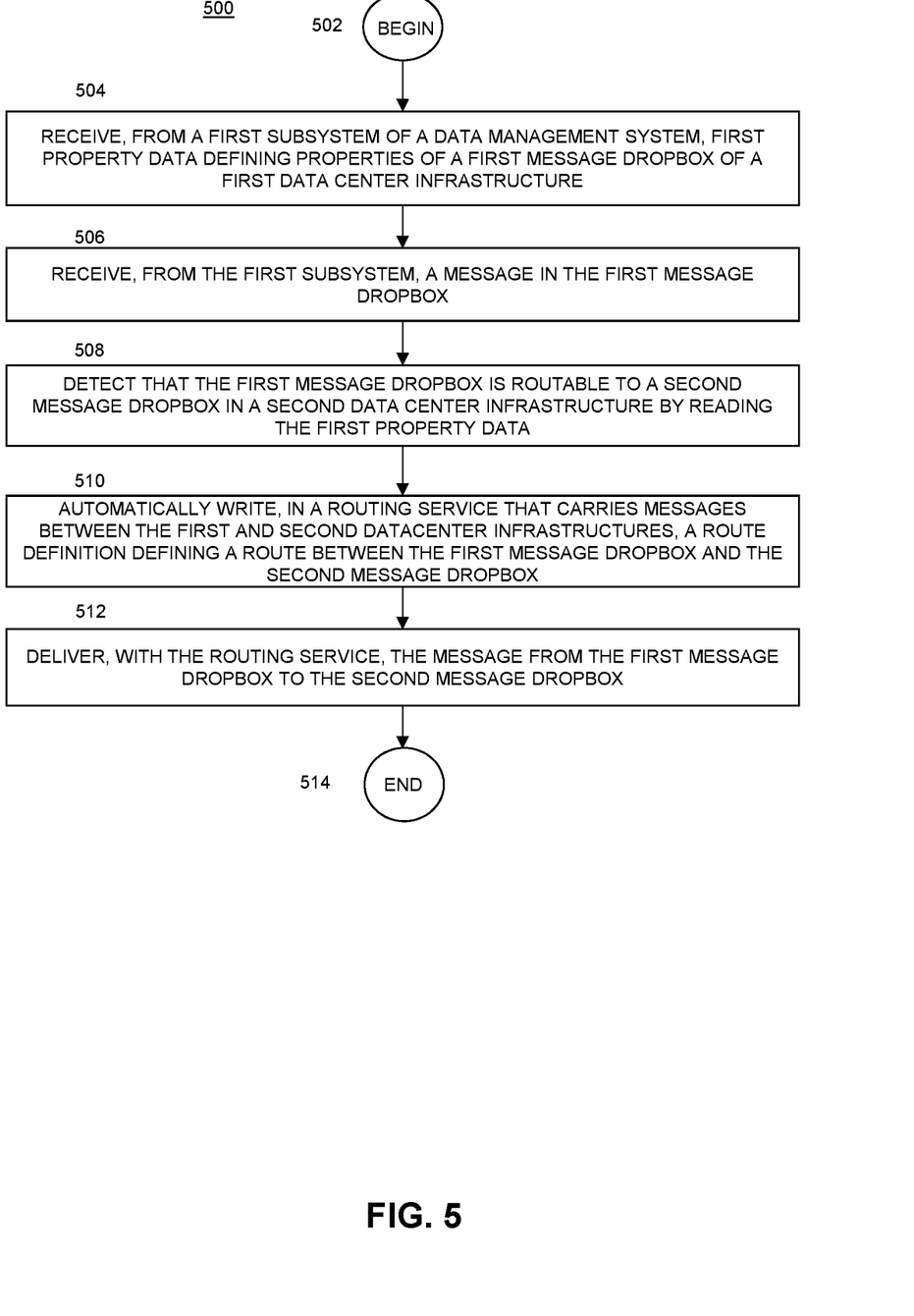
FIG. 5 is a flow diagram of a process for dynamically and automatically establishing messaging routes between separate data center infrastructures, in accordance with one embodiment.

At 504, first property data is received, from a first subsystem of a data management system, defining properties of a first message dropbox of a first data center infrastructure, using any of the methods, processes, and procedures discussed above with respect to FIGS. 1-4.

Once first property data is received, from a first subsystem of a data management system, defining properties of a first message dropbox of a first data center infrastructure at 504, process flow proceeds to 506.

At 506, a message is received in the first message dropbox from the first subsystem, using any of the methods, processes, and procedures discussed above with respect to FIGS. 1-4.

Once a message is received in the first message dropbox from the first subsystem at 506, process flow proceeds to 508.

At 508, it is detected that the first message dropbox is routable to a second message dropbox in a second data center infrastructure by reading the first property data, using any of the methods, processes, and procedures discussed above with respect to FIGS. 1-4.

Once it is detected that the first message dropbox is routable to a second message dropbox in a second data center infrastructure by reading the first property data at 508, process flow proceeds to 510.

At 510, a route definition is automatically written, in a routing service that carries messages between the first and second datacenter infrastructures, defining a route between the first message dropbox and the second message dropbox, using any of the methods, processes, and procedures discussed above with respect to FIGS. 1-4.

Once a route definition is automatically written, in a routing service that carries messages between the first and second datacenter infrastructures, defining a route between the first message dropbox and the second message dropbox at 510, process flow proceeds to 512.

At 512, the message is delivered, with the routing service, from the first message dropbox to the second message dropbox, using any of the methods, processes, and procedures discussed above with respect to FIGS. 1-4.

Once the messaged is delivered, with the routing service, from the first message dropbox to the second message dropbox at 512, process flow proceeds to 514.

At 514 the process 500 for dynamically and automatically establishing messaging routes between separate data center infrastructures is exited to await new data and/or instructions.

Figure 6:
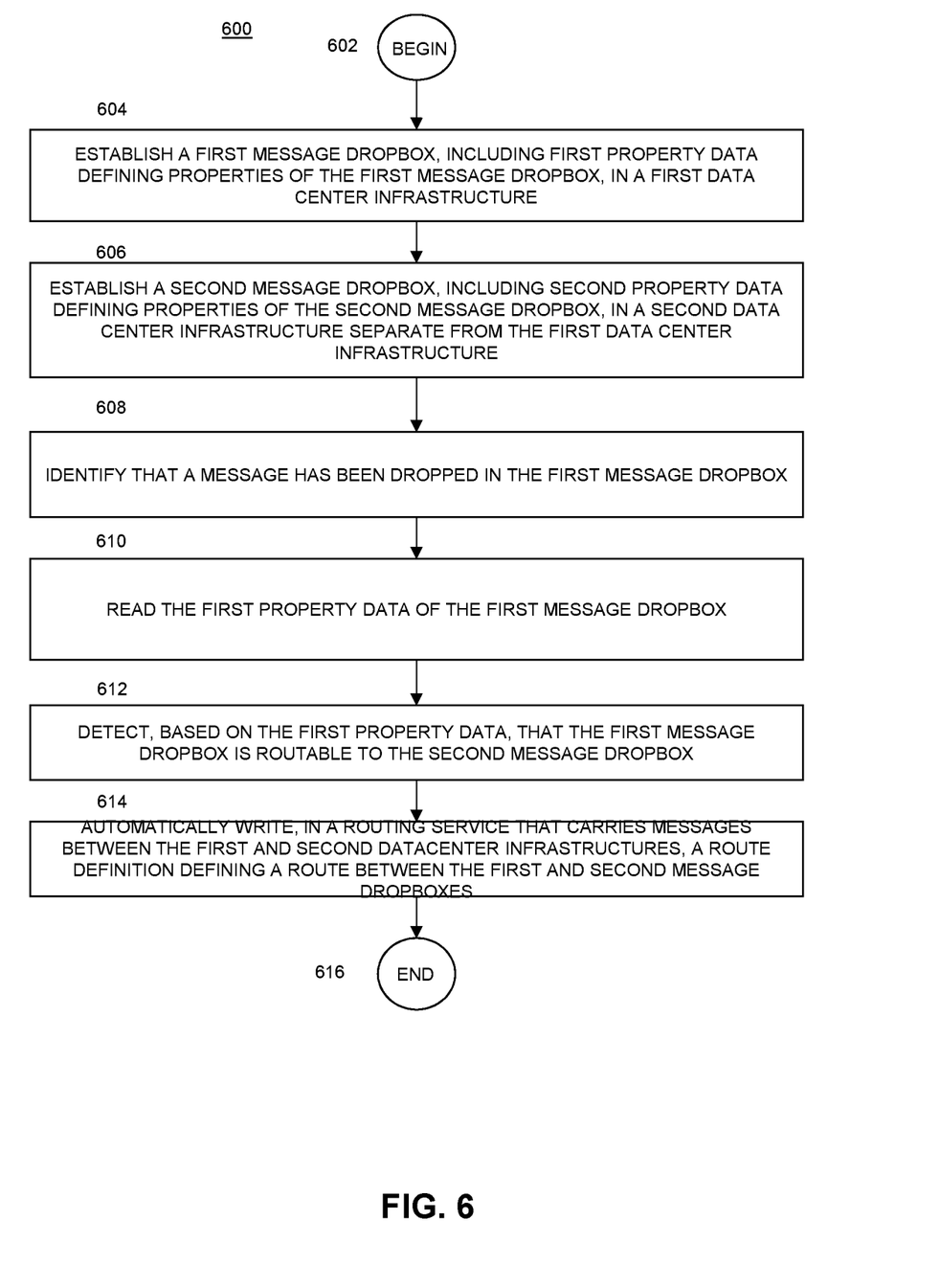
FIG. 6 is a flow diagram of a process for dynamically and automatically establishing messaging routes between separate data center infrastructures, in accordance with one embodiment.

FIG. 6 illustrates a flow diagram of a process 600 for dynamically and automatically establishing messaging routes between separate data center infrastructures, in various embodiments.

Referring to FIGS. 1-4, 6, and the description of FIGS. 1-4 above, process 600 begins at 602 and process flow proceeds to 604.

At 604, a first message dropbox is established, including first property data defining properties of the first message dropbox, in a first data center infrastructure, using any of the methods, processes, and procedures discussed above with respect to FIGS. 1-4.

Once a first message dropbox is established, including first property data defining properties of the first message dropbox, in a first data center infrastructure at 604 process flow proceeds to 606.

At 606, a second message dropbox is established, including second property data defining properties of the second message dropbox, in a second data center infrastructure separate from the first data center infrastructure, using any of the methods, processes, and procedures discussed above with respect to FIGS. 1-4.

Once a second message dropbox is established, including second property data defining properties of the second message dropbox, in a second data center infrastructure separate from the first data center infrastructure at 606, process flow proceeds to 608.

At 608, it is identified that a message has been dropped in the first message dropbox, using any of the methods, processes, and procedures discussed above with respect to FIGS. 1-4.

Once it is identified that a message has been dropped in the first message dropbox at 608, process flow proceeds to 610.

At 610, the first property data of the first message dropbox is read, using any of the methods, processes, and procedures discussed above with respect to FIGS. 1-4.

Once the first property data of the first message dropbox is read at 610, process flow proceeds to 612.

At 612, it is detected, based on the first property data, that the first message dropbox is routable to the second message dropbox, using any of the methods, processes, and procedures discussed above with respect to FIGS. 1-4.

Once it is detected, based on the first property data, that the first message dropbox is routable to the second message dropbox at 612, process flow proceeds to 614.

At 614, a route definition is automatically written, in a routing service that carries messages between the first and second datacenter infrastructures, defining a route between the first and second message dropboxes, using any of the methods, processes, and procedures discussed above with respect to FIGS. 1-4.

Once a route definition is automatically written, in a routing service that carries messages between the first and second datacenter infrastructures, defining a route between the first and second message dropboxes at 614, process flow proceeds to 616.

At 616 the process 600 for dynamically and automatically establishing messaging routes between separate data center infrastructures is exited to await new data and/or instructions.

As noted, the specific illustrative examples discussed above are but illustrative examples of implementations of embodiments of the method or process for dynamically and automatically establishing messaging routes between separate data center infrastructures. Those of skill in the art will readily recognize that other implementations and embodiments are possible. Therefore, the discussion above should not be construed as a limitation on the claims provided below.

A method includes establishing a first message dropbox, including first property data defining properties of the first message dropbox, in a first data center infrastructure. The method includes establishing a second message dropbox, including second property data defining properties of the second message dropbox, in a second data center infrastructure separate from the first data center infrastructure. The method includes identifying that a message has been dropped in the first message dropbox and reading the first property data of the first message dropbox. The method includes detecting, based on the first property data, that the first message dropbox is routable to the second message dropbox and automatically writing, in a routing service that carries messages between the first and second datacenter infrastructures, a route definition defining a route between the first and second message dropboxes.

The disclosed method and system for dynamically and automatically establishing messaging routes between separate data center infrastructures greatly enhances the efficiency of messaging platforms. Embodiments of the present disclosure enable the dynamic creation of routes without interrupting the messaging platform. Embodiments of the present disclosure enable the dynamic creation of routes without needing software engineers to manually define routes in a routing service. Consequently, using the disclosed method and system for dynamically and automatically establishing messaging routes between separate data center infrastructures results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for dynamically and automatically establishing messaging routes between separate data center infrastructures.

The disclosed embodiments provide a method and system for dynamically and automatically establishing messaging routes between separate data center infrastructures more efficiently is provided. Therefore, the disclosed embodiments provide a technical solution to the long-standing technical problem of data service applications that are not easily scalable.

Using the disclosed embodiments result is a much more adaptable and robust method and system for dynamically and automatically establishing messaging routes between separate data center infrastructures. This, in turn, results in: less human and processor resources being dedicated to manually generating and implementing new routes. Accordingly, less time required is for analysis by humans, fewer processing resources are used, fewer memory storage assets are used, and less communication bandwidth is utilized to transmit data for analysis.

The disclosed method and system for dynamically and automatically establishing messaging routes between separate data center infrastructures does not encompass, embody, or preclude other forms of innovation in the area of data management systems. In addition, the disclosed method and system for dynamically and automatically establishing messaging routes between separate data center infrastructures is not related to any fundamental economic practice, fundamental data processing practice, mental steps, or pen and paper-based solutions, and is, in fact, directed to providing solutions to new and existing problems associated with data management systems. Consequently, the disclosed method and system for dynamically and automatically establishing messaging routes between separate data center infrastructures, does not encompass, and is not merely, an abstract idea or concept.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing method, comprising:
 establishing a first message dropbox, including first property data defining properties of the first message dropbox, in a first data center infrastructure;
 establishing a second message dropbox, including second property data defining properties of the second message dropbox, in a second data center infrastructure separate from the first data center infrastructure;
 identifying that a message has been dropped in the first message dropbox;
 reading the first property data of the first message dropbox;
 detecting, based on the first property data, that the first message dropbox is routable to the second message dropbox; and
 automatically writing, in a routing service that carries messages between the first and second datacenter infrastructures, a route definition defining a route between the first and second message dropboxes.

2. The method of claim 1, wherein the first property data includes a name of the first message dropbox indicating that the first message dropbox is routable to the second message dropbox.

3. The method of claim 2, further comprising automatically writing the route definition based on the second property data.

4. The method of claim 2, wherein routability is determined, at least in part, based on the name of the first dropbox including a portion of a name of the second dropbox.

5. The method of claim 2, wherein the first message dropbox is a queue type message dropbox whose messages can only be received by the second message dropbox.

6. The method of claim 1, wherein the first message dropbox is associated with a first subsystem of a data management system, wherein the second message dropbox is associated with a second subsystem of the data management system.

7. The method of claim 6, wherein the message is generated by the first subsystem for the second subsystem.

8. The method of claim 6, wherein establishing the first message dropbox includes receiving the first property data from the first subsystem.

9. The method of claim 1, wherein the first property data includes first policy data indicating that the first message dropbox is routable, wherein the second property data includes second policy data, wherein detecting that the first message dropbox is routable to the second message dropbox includes comparing the first policy data to the second policy data.

10. The method of claim 9, wherein detecting that the first message dropbox is routable to the second message dropbox includes detecting that the second policy data matches the first policy data.

11. The method of claim 9, wherein the policy data indicates that the first message dropbox is a topic type message dropbox whose messages can be received by multiple subsystems of the data management system.

12. A method, comprising:
receiving, from a first subsystem of a data management system, first property data defining properties of a first message dropbox of a first data center infrastructure;
receiving, from the first subsystem, a message in the first message dropbox;
detecting that the first message dropbox is routable to a second message dropbox in a second data center infrastructure by reading the first property data;
automatically writing, in a routing service that carries messages between the first and second datacenter infrastructures, a route definition defining a route between the first message dropbox and the second message dropbox; and
delivering, with the routing service, the message from the first message dropbox to the second message dropbox.

13. The method of claim 12, wherein the first data center infrastructure is associated with the data management system, wherein the second data center infrastructure is a third-party cloud computing infrastructure.

14. The method of claim 12, wherein the first and second data center infrastructures correspond to separate cloud computing data center infrastructures.

15. The method of claim 12, wherein the first property data includes a name that indicates that the first message dropbox is routable to the second message dropbox.

16. A system, comprising:
at least one processor; and
at least one memory coupled to the at least one processor, the at least one memory having stored therein instructions which, when executed by any set of the one or more processors, perform a process including:
receiving, from a first subsystem of a data management system, first policy data defining policies of a first message dropbox of a first data center infrastructure;
receiving, from the first subsystem, a message in the first message dropbox;
detecting that the first message dropbox is routable to a second dropbox in a second data center infrastructure by comparing the first policy data to second policy data associated with a second dropbox in a second data center infrastructure;
automatically writing, in a routing service that carries messages between the first and second datacenter infrastructures, a route definition defining a route between the first message dropbox and the second dropbox; and
delivering, with the routing service, the message from the first message dropbox to the second message dropbox.

17. The system of claim 16, wherein the process includes providing the message to a second subsystem of the data management system via the second message dropbox.

18. The system of claim 17, wherein the process includes providing the message to a third subsystem of the data management system via the first message dropbox.

19. The system of claim 16, wherein the data management system includes one or more of:
a tax return preparation system;
a bookkeeping system;
a budgeting system;
a financial transaction monitoring system; and
a personal financial management system.

20. The system of claim 16, wherein the message includes data collected by the first subsystem for the data management system.

* * * * *